US012645251B2

(12) United States Patent
Waśko et al.

(10) Patent No.: US 12,645,251 B2
(45) Date of Patent: Jun. 2, 2026

(54) OFFLOADED INTRA-SYSTEM SYNCHRONIZATION

(71) Applicant: MELLANOX TECHNOLOGIES, LTD., Yokneam (IL)

(72) Inventors: Wojciech Waśko, Młynek (PL); Dotan David Levi, Kiryat Motzkin (IL); Natan Manevich, Nesher (IL); Maciej Machnikowski, Reda (PL)

(73) Assignee: Mellanox Technologies, Ltd, Yokneam (IL)

( * ) Notice: Subject to any disclaimer, the term of this patent is extended or adjusted under 35 U.S.C. 154(b) by 263 days.

(21) Appl. No.: 18/470,452

(22) Filed: Sep. 20, 2023

(65) Prior Publication Data

US 2025/0093905 A1     Mar. 20, 2025

(51) Int. Cl.
| | |
|---|---|
| *G06F 1/12* | (2006.01) |
| *G06F 13/42* | (2006.01) |
| *H04L 7/033* | (2006.01) |

(52) U.S. Cl.
CPC ............ *G06F 1/12* (2013.01); *G06F 13/4291* (2013.01); *H04L 7/033* (2013.01)

(58) Field of Classification Search
CPC .................. G06F 1/12; G06F 13/4291; G06F 2213/0026; H04L 7/33
(Continued)

(56) References Cited

U.S. PATENT DOCUMENTS

| | | |
|---|---|---|
| 5,392,421 A | 2/1995 | Lennartsson |
| 5,402,394 A | 3/1995 | Turski |

(Continued)

FOREIGN PATENT DOCUMENTS

| | | |
|---|---|---|
| AU | 2023200522 B1 | 4/2023 |
| CN | 106817183 A | 6/2017 |

(Continued)

OTHER PUBLICATIONS

Zhang et al., "Ti BAW technology enables ultra-low jitter clocks for highspeed networks", White paper, Texas Instruments, pp. 1-11, Feb. 2019.

(Continued)

*Primary Examiner* — Brian T Misiura
(74) *Attorney, Agent, or Firm* — Meitar Patents LTD.; Daniel Kligler

(57)                ABSTRACT

In one embodiment, a peripheral device includes an oscillator, a counter to be driven by the oscillator and provide a peripheral device counter value, and processing circuitry to receive a host device counter value from a host device, read host device clock translation parameters from a host memory of the host device, the host device clock translation parameters providing translation between the host device counter value and a host device clock time, read peripheral device clock translation parameters providing a translation between the peripheral device counter value and a peripheral device clock time, read the peripheral device counter value, compute a clock correction as a function of a difference between the host device clock time and the peripheral clock time, based on the host device and peripheral device counter values and clock translation parameters, and correct the host device or peripheral device clock translation parameters based on the clock correction.

18 Claims, 9 Drawing Sheets

(58) Field of Classification Search
USPC ................................................. 713/400, 503
See application file for complete search history.

(56) References Cited

U.S. PATENT DOCUMENTS

| | | | |
|---|---|---|---|
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,081,143 A | 6/2000 | Ho et al. |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,623,173 B1 | 4/2020 | Geng et al. |
| 10,637,776 B2 | 4/2020 | Iwasaki |
| 10,727,966 B1 | 7/2020 | Izenberg et al. |
| 10,778,361 B1 | 9/2020 | Almog et al. |
| 10,778,406 B2 | 9/2020 | Gaist et al. |
| 10,841,243 B2 | 11/2020 | Levi et al. |
| 10,879,910 B1 | 12/2020 | Franck et al. |
| 10,887,077 B1 | 1/2021 | Tvry |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 11,539,451 B2 * | 12/2022 | Herber ................. H04J 3/0638 |
| 11,552,871 B2 * | 1/2023 | Sela ...................... H04J 3/0697 |
| 11,606,157 B1 | 3/2023 | Wasko et al. |
| 11,706,014 B1 | 7/2023 | Manevich et al. |
| 11,835,999 B2 | 12/2023 | Shapira et al. |
| 11,907,754 B2 * | 2/2024 | Wasko ................. G06F 9/4825 |
| 12,289,389 B2 | 4/2025 | Manevich et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0100054 A1 | 5/2005 | Scott et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0055676 A1 | 2/2009 | Wiebe |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0131766 A1 | 5/2015 | Chen et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0078901 A1 | 3/2016 | Toma et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0299221 A1 | 10/2016 | Bushnell et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |

(56) References Cited

U.S. PATENT DOCUMENTS

| | | |
|---|---|---|
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0098320 A1 | 4/2018 | Gan et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2018/0321358 A1 | 11/2018 | Carswell et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0220300 A1 | 7/2019 | Rosenboom |
| 2019/0265997 A1 | 8/2019 | Merrill et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0235905 A1 | 7/2020 | Su et al. |
| 2020/0266967 A1 | 8/2020 | Fisher et al. |
| 2020/0287557 A1 | 9/2020 | Horovitz et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2020/0403652 A1 | 12/2020 | Goff et al. |
| 2021/0006344 A1 | 1/2021 | Chen et al. |
| 2021/0141413 A1 | 5/2021 | Levi et al. |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0045768 A1 | 2/2022 | Cingoz et al. |
| 2022/0066978 A1 | 3/2022 | Mishra et al. |
| 2022/0086105 A1 | 3/2022 | Levi et al. |
| 2022/0116473 A1* | 4/2022 | Levi .................. H04W 72/1263 |
| 2022/0121691 A1 | 4/2022 | Barathi |
| 2022/0173741 A1 | 6/2022 | Ravid et al. |
| 2022/0191275 A1 | 6/2022 | Levi et al. |
| 2022/0191578 A1 | 6/2022 | Ramkumar et al. |
| 2022/0224500 A1 | 7/2022 | Mula et al. |
| 2022/0239549 A1 | 7/2022 | Zhao et al. |
| 2022/0303034 A1 | 9/2022 | Lesi et al. |
| 2022/0337683 A1* | 10/2022 | Biederman ............. H04L 69/28 |
| 2022/0342086 A1 | 10/2022 | Yoshida |
| 2022/0345417 A1 | 10/2022 | Kasichainula et al. |
| 2022/0352998 A1 | 11/2022 | Levi et al. |
| 2022/0357763 A1 | 11/2022 | Levy et al. |
| 2022/0360423 A1 | 11/2022 | Levi et al. |
| 2022/0385598 A1 | 12/2022 | Pismenny et al. |
| 2022/0390979 A1 | 12/2022 | Xu |
| 2022/0416925 A1 | 12/2022 | Levi et al. |
| 2023/0077631 A1* | 3/2023 | Biederman ........... H04L 43/087 709/224 |
| 2023/0110161 A1 | 4/2023 | Nadeau-Dostie et al. |
| 2023/0163869 A1 | 5/2023 | Shapira et al. |
| 2023/0185600 A1 | 6/2023 | Wasko et al. |
| 2023/0189242 A1 | 6/2023 | Aronkytö |
| 2023/0236624 A1 | 7/2023 | Levi et al. |
| 2023/0251899 A1 | 8/2023 | Levi et al. |
| 2023/0341889 A1 | 10/2023 | Elliott |
| 2023/0367358 A1 | 11/2023 | Manevich et al. |
| 2023/0370305 A1 | 11/2023 | Manevich et al. |
| 2024/0014916 A1 | 1/2024 | Kernen et al. |
| 2024/0031121 A1 | 1/2024 | Levi et al. |
| 2024/0031124 A1 | 1/2024 | Levi et al. |
| 2025/0021130 A1* | 1/2025 | Manevich ................. G06F 1/12 |
| 2025/0085739 A1 | 3/2025 | Ma et al. |
| 2025/0208647 A1* | 6/2025 | So ............................ G06F 1/08 |
| 2025/0240110 A1 | 7/2025 | Manevich et al. |

FOREIGN PATENT DOCUMENTS

| | | |
|---|---|---|
| CN | 108829493 A | 11/2018 |
| CN | 110581744 A | 12/2019 |
| CN | 114513293 A | 5/2022 |
| CN | 114647179 A | 6/2022 |
| CN | 115189796 A | 10/2022 |
| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

Skywork Solutions Inc., "PCI Express 3.1 Jitter Requirements", AN562, pp. 1-16, year 2021.

Intel, "Can Altera GX/GT/GZ device high speed transceivers handle Spread Spectrum Clocking (SSC), as required by PCIe or SATA/SAS protocols?", p. 1, Sep. 11, 2012.

"IEEE Standard for Local and Metropolitan Area Networks—Timing and Synchronization for Time-Sensitive Applications," IEEE Std 802.1AS-2020, IEEE Computer Society, pp. 1-421, year 2020.

U.S. Appl. No. 17/885,604 Office Action dated Nov. 13, 2024.

U.S. Appl. No. 17/867,779 Office Action dated Jan. 30, 2025.

Microchip Technology Incorporated, "MAC-SA5X—Miniature Atomic Clock," pp. 1-4, year 2021, as downloaded from chrome-extension://efaidnbmnnnibpcajpcglclefindmkaj/https://ww1.microchip.com/downloads/en/DeviceDoc/00003348.pdf.

Sitime Corp., "Indispensible for the Global Network—Epoch Platform—Reimaging the Holdover OCXO for Better Service Continuity," pp. 1-10, year 2023, as downloaded from https://web.archive.org/web/20231005163946/https://www.sitime.com/.

QSFP-DD MSA, "QSFP-DD/QSFP-DD800/QSFP112 Hardware Specification for QSFP Double Density 8X and QSFP 4X Pluggable Transceivers," Revision 6.2, pp. 1-169, Mar. 11, 2022, as downloaded from chrome-extension://efaidnbmnnnibpcajpcglclefindmkaj/http://www.qsfp-dd.com/wp-content/uploads/2022/03/QSFP-DD-Hardware-Rev6.2.pdf.

Lee, QSFP-DD Wiki and Comparison of QSFP-DD vs OSFP and QSFP, Blogs, QSFPTEK, pp. 1-4, Jun. 17, 2022, as downloaded from https://store.qsfptek.com/blogs/article/qsfp-dd-wiki-and-comparison-of-qsfp-dd-vs-osfp-and-qsfp.

IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2 USA, year 2008.

Wikipedia—"Precision Time Protocol", pp. 1-8, Aug. 24, 2019.

(56) References Cited

OTHER PUBLICATIONS

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
ITU-T Standard G.8264/Y. 1364, "Distribution of timing information through packet networks", pp. 1-42, Aug. 2017.
Ipclock, "IEEE 1588 Primer," ip-clock.com, pp. 1-3, May 1, 2017 (downloaded from https://web.archive.org/web/20170501192647/http://ip-clock.com/IEEE-1588-primer/).
ITU-T Standard G.8261/Y.1361, "Timing and synchronization aspects in packet networks", pp. 1-120, Aug. 2019.
ITU-T Standard G.8262/Y. 1362, "Timing characteristics of synchronous equipment slave clock", pp. 1-44, Nov. 2018.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
Wasko et al., U.S. Appl. No. 18/111,916, filed Feb. 21, 2023.
Manevich et al., U.S. Appl. No. 18/349,976, filed Jul. 11, 2023.

Corbett et al., "Spanner: Google's Globally Distributed Database," ACM Transactions on Computer Systems, vol. 31, No. 3, article 8, pp. 1-22, Aug. 2013.
SiTime Corporation, "Sit5377—60 to 220 MHz, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
U.S. Appl. No. 17/313,026 Office Action dated Dec. 19, 2023.
U.S. Appl. No. 17/191,736 Office Action dated Jan. 5, 2024.
Wikipedia, "Coordinated Universal Time," pp. 1-14, last updated Dec. 1, 2023.
Wikipedia, "Satellite Navigation," p. 1-11, last updated Nov. 28, 2023.
Wikipedia, "Crystal Oven," pp. 1-4, last updated Dec. 2, 2023.
Wikipedia, "Clock and Data Recovery/Structures and Types of CDR", pp. 1-11, last updated Apr. 29, 2022.
Manevich et al., U.S. Appl. No. 18/448,936, filed Aug. 13, 2023.
Texas Instruments, "LMK05318 Ultra-Low Jitter Network Synchronizer Clock With Two Frequency Domains," Product Information, pp. 1-86, year 2018.
Manevich et al., U.S. Appl. No. 18/067,767, filed Dec. 19, 2022.
Manevich et al., U.S. Appl. No. 18/475,297, filed Sep. 27, 2023.
U.S. Appl. No. 17/867,779 Office Action dated Mar. 28, 2024.
US Non-Final Office Action, U.S. Appl. No. 18/420,822, dated Jan. 7, 2026.
Notice of References Cited, U.S. Appl. No. 18/420,822, dated Jan. 7, 2026.
K. B. Stanton et al., "Precision Time in the Last Centimeters for Distributed Applications," 2024 IEEE ISPCS, Tokyo, Japan, 2024, pp. 1-6, doi: 10.1109/ISPCS63021.2024.10747729. (Year: 2024).
Stanton, "Distributing Deterministic, Accurate Time for Tightly Coordinated Network and Software Applications: IEEE 802.1AS, the TSN profile of PTP," in IEEE Communications Standards Magazine, vol. 2, No. 2, pp. 34-40, Jun. 2018, doi: 10.1109/MCOMSTD.2018.1700086. (Year: 2018).
Non-Final Office Action, U.S. Appl. No. 18/964,450, dated Apr. 3, 2026.
Notice of References Cited, U.S. Appl. No. 18/964,450, dated Apr. 3, 2026.

* cited by examiner

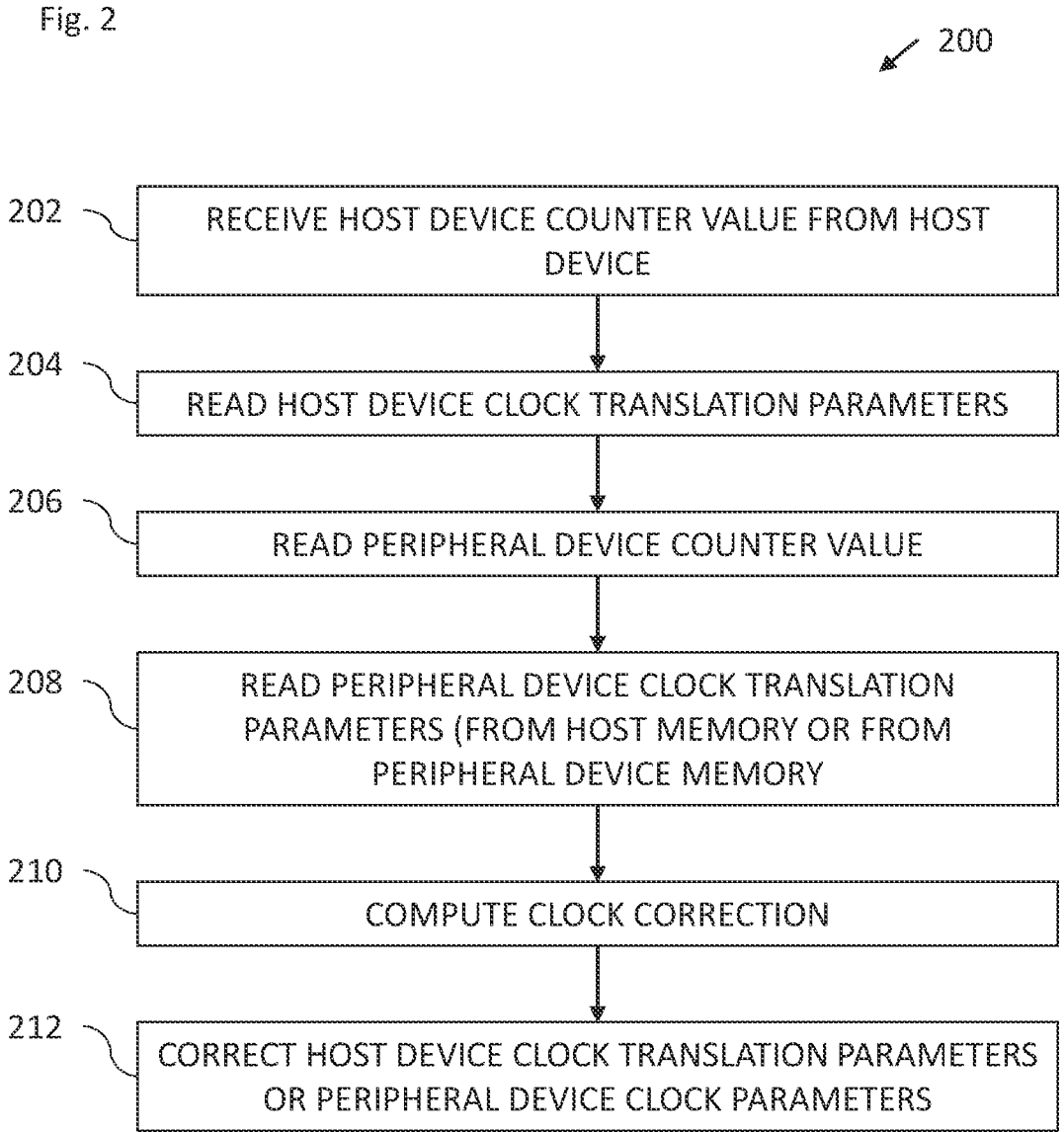

202 — RECEIVE HOST DEVICE COUNTER VALUE FROM HOST DEVICE

204 — READ HOST DEVICE CLOCK TRANSLATION PARAMETERS

206 — READ PERIPHERAL DEVICE COUNTER VALUE

208 — READ PERIPHERAL DEVICE CLOCK TRANSLATION PARAMETERS (FROM HOST MEMORY OR FROM PERIPHERAL DEVICE MEMORY

210 — COMPUTE CLOCK CORRECTION

212 — CORRECT HOST DEVICE CLOCK TRANSLATION PARAMETERS OR PERIPHERAL DEVICE CLOCK PARAMETERS

HOST MACHINE

HOST MEMORY

HOST DEVICE CLOCK TRANSLATION PARAMETERS

PERIPHERAL DEVICE CLOCK TRANSLATION PARAMETERS

HOST MACHINE

HOST MEMORY

HOST DEVICE CLOCK TRANSLATION PARAMETERS

PERIPHERAL DEVICE CLOCK TRANSLATION PARAMETERS

HOST MACHINE

HOST MEMORY

HOST DEVICE CLOCK TRANSLATION PARAMETERS

PERIPHERAL DEVICE CLOCK TRANSLATION PARAMETERS 506    506      28-2   504     28-3

Figure 5:
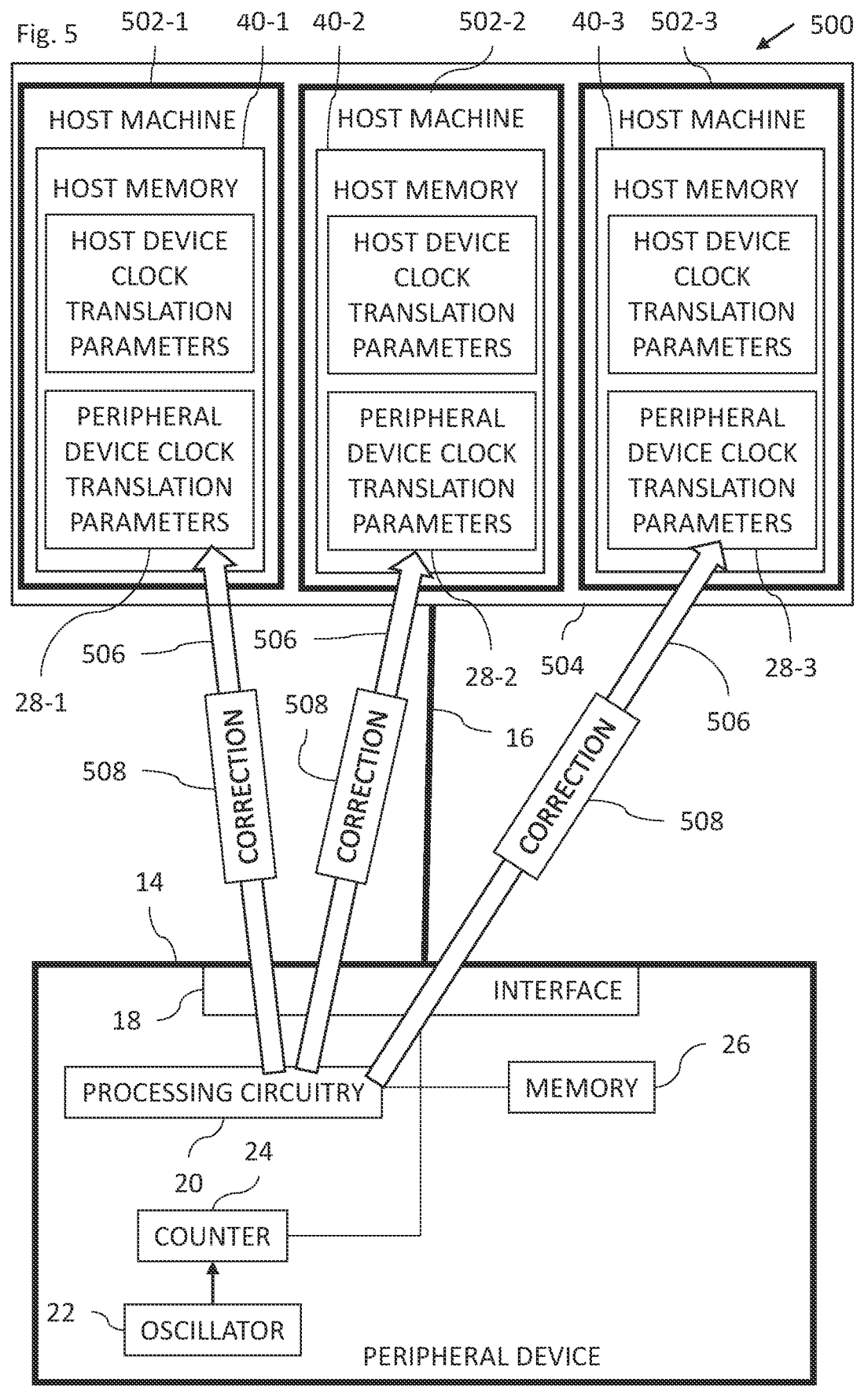

28-1      508     16

508     506

CORRECTION   CORRECTION   CORRECTION   508

14

18     INTERFACE     26

PROCESSING CIRCUITRY    MEMORY 20   24

COUNTER

22   OSCILLATOR     PERIPHERAL DEVICE

700

702 — READ HOST DEVICE COUNTER VALUE

704 — READ HOST DEVICE CLOCK TRANSLATION PARAMETERS FROM HOST MEMORY

706 — RECEIVE PERIPHERAL DEVICE COUNTER VALUE FROM PERIPHERAL DEVICE

708 — READ PERIPHERAL DEVICE CLOCK TRANSLATION PARAMETERS FROM HOST DEVICE MEMORY

710 — COMPUTE CLOCK CORRECTION

712 — CORRECT HOST DEVICE CLOCK TRANSLATION PARAMETERS OR PERIPHERAL DEVICE CLOCK PARAMETERS

OFFLOADED INTRA-SYSTEM SYNCHRONIZATION

FIELD OF THE INVENTION

The present invention relates to computer systems, and in particular, but not exclusively, to clock synchronization.

BACKGROUND

A hardware clock in a network device may be disciplined to a remote clock such as a clock over the network or to a Global navigation satellite system (GNSS). Many clock synchronization methods are available to provide accurate clock synchronization. One such method is based on the Precision Time Protocol (PTP), for example.

A hardware clock in a host device connected to the network device may synchronize to the hardware clock in the network device. One method is for the host device to poll the network device several times for the time maintained by the network device and take an average of the received times. This method may introduce errors of at least a few hundred nanoseconds, which in many applications is too large.

Another method for synchronizing the clock of a host device to the clock of a network device is Precision Time Measurement (PTM), a supported feature in the PCI-SIG® PCI Express 3.0 specification, which defines a new protocol of timing measurement and synchronization messages for time-sensitive media and server applications. Examples include industrial automation, instrumentation, geological sciences, telecom synchronization, and synchronized audio/video systems, among others. PTM enables systems that require high precision timing, the ability to monitor and track the time of transactions with sub-microsecond timing accuracy while accelerating server application performance.

SUMMARY

There is provided in accordance with an embodiment of the present disclosure, a peripheral device, including an oscillator, a counter to be driven by the oscillator and provide a peripheral device counter value, and processing circuitry to receive a host device counter value from a host device, read host device clock translation parameters from a host memory of the host device, the host device clock translation parameters providing a translation between the host device counter value and a host device clock time, read peripheral device clock translation parameters, the peripheral device clock translation parameters providing a translation between the peripheral device counter value and a peripheral device clock time, read the peripheral device counter value, compute a clock correction as a function of a difference between the host device clock time and the peripheral clock time, based on the host device counter value, the host device clock translation parameters, the peripheral device counter value, and the peripheral device clock translation parameters, and correct the host device clock translation parameters or the peripheral device clock translation parameters based on the clock correction.

Further in accordance with an embodiment of the present disclosure the peripheral device clock translation parameters are stored in the host memory, and the processing circuitry is configured to read the peripheral device clock translation parameters from the host memory.

Still further in accordance with an embodiment of the present disclosure the processing circuitry is to correct the peripheral device clock translation parameters thereby causing the peripheral device clock time to follow the host device clock time.

Additionally in accordance with an embodiment of the present disclosure the peripheral device clock translation parameters are stored in the host memory, and the processing circuitry is to correct the peripheral device clock translation parameters in the host memory.

Moreover, in accordance with an embodiment of the present disclosure the peripheral device clock translation parameters are stored in the peripheral device, and the processing circuitry is to correct the peripheral device clock translation parameters stored in the peripheral device.

Further in accordance with an embodiment of the present disclosure the processing circuitry is to correct the host device clock translation parameters thereby causing the host device clock time to follow the peripheral device clock time.

Still further, in accordance with an embodiment of the present disclosure the processing circuitry is to receive the host device counter value from a data communication bus root port of the host device.

Additionally in accordance with an embodiment of the present disclosure the processing circuitry is to correct multiple sets of peripheral device translation parameters providing translations between the peripheral device counter value and respective peripheral device clock times with respect to respective host device clock times of respective multiple host machines.

Moreover, in accordance with an embodiment of the present disclosure the processing circuitry is to correct the multiple sets of the peripheral device translation parameters stored in host memories of the respective multiple host machines.

Further in accordance with an embodiment of the present disclosure the processing circuitry is to correct multiple sets of host device translation parameters providing translations between host device counter values and respective host device clock times of respective multiple host machines with respect to the peripheral device clock time causing each of the host device clock times to follow the peripheral device clock time.

Still further, in accordance with an embodiment of the present disclosure the processing circuitry is to correct the multiple sets of the host device translation parameters stored in host memories of the respective multiple host machines.

There is also provided in accordance with still another embodiment of the present disclosure a system, including the peripheral device, and a host device to execute software to offload to the peripheral device computation of the clock correction, and correction of the host device clock translation parameters or the peripheral device clock translation parameters based on the clock correction.

There is also provided in accordance with another embodiment of the present disclosure, a host device, including an oscillator, a counter to be driven by the oscillator and provide a host device counter value, a host memory to store host device clock translation parameters providing a translation between the host device counter value and a host device clock time, a data communication bus root port to receive a peripheral device counter value from a peripheral device via a data communication bus, read peripheral device clock translation parameters from the host memory, the peripheral device clock translation parameters providing a translation between the peripheral device counter value and a peripheral device clock time, read the host device clock translation parameters from the host memory, compute a clock correction as a function of a difference between the host device clock time and the peripheral clock time, based on the host device counter value, the host device clock translation parameters, the peripheral device counter value, and the peripheral device clock translation parameters, and correct the host device clock translation parameters or the peripheral device clock translation parameters based on the clock correction.

Additionally in accordance with an embodiment of the present disclosure the data communication bus root port is to correct the peripheral device clock translation parameters thereby causing the peripheral device clock time to follow the host device clock time.

Moreover, in accordance with an embodiment of the present disclosure the data communication bus root port is to correct the host device clock translation parameters thereby causing the host device clock time to follow the peripheral device clock time.

There is also provided in accordance with still another embodiment of the present disclosure a method, including driving a counter by an oscillator, providing, by the counter, a peripheral device counter value, receiving a host device counter value from a host device, reading host device clock translation parameters from a host memory of the host device, the host device clock translation parameters providing a translation between the host device counter value and a host device clock time, reading peripheral device clock translation parameters, the peripheral device clock translation parameters providing a translation between the peripheral device counter value and a peripheral device clock time, reading the peripheral device counter value, computing a clock correction as a function of a difference between the host device clock time and the peripheral clock time, based on the host device counter value, the host device clock translation parameters, the peripheral device counter value, and the peripheral device clock translation parameters, and correcting the host device clock translation parameters or the peripheral device clock translation parameters based on the clock correction.

Further in accordance with an embodiment of the present disclosure the correcting includes correcting the peripheral device clock translation parameters thereby causing the peripheral device clock time to follow the host device clock time.

Still further in accordance with an embodiment of the present disclosure the correcting includes correcting the host device clock translation parameters thereby causing the host device clock time to follow the peripheral device clock time.

Additionally in accordance with an embodiment of the present disclosure the correcting includes correcting multiple sets of peripheral device translation parameters providing translations between the peripheral device counter value and respective peripheral device clock times with respect to respective host device clock times of respective multiple host machines.

Moreover, in accordance with an embodiment of the present disclosure the correcting includes correcting multiple sets of host device translation parameters providing translations between host device counter values and respective host device clock times of respective multiple host machines with respect to the peripheral device clock time causing each of the host device clock times to follow the peripheral device clock time.

There is also provided in accordance with still another embodiment of the present disclosure a method, including driving a counter by an oscillator, providing, by the counter, a host device counter value, storing host device clock translation parameters providing a translation between the host device counter value and a host device clock time, receiving, by a data communication bus root port, a peripheral device counter value from a peripheral device via a data communication bus, reading, by the data communication bus root port, peripheral device clock translation parameters from the host memory, the peripheral device clock translation parameters providing a translation between the peripheral device counter value and a peripheral device clock time, reading, by the data communication bus root port, the host device clock translation parameters from the host memory, computing, by the data communication bus root port, a clock correction as a function of a difference between the host device clock time and the peripheral clock time, based on the host device counter value, the host device clock translation parameters, the peripheral device counter value, and the peripheral device clock translation parameters, and correcting, by the data communication bus root port, the host device clock translation parameters or the peripheral device clock translation parameters based on the clock correction.

BRIEF DESCRIPTION OF THE DRAWINGS

The present invention will be understood from the following detailed description, taken in conjunction with the drawings in which:

FIG. 2 is a flowchart including steps in a method of operation of the system of FIG. 1;

FIGS. 5 and 6 are block diagram views of multi-host clock synchronization systems constructed and operative in accordance with an embodiment of the present invention;

DESCRIPTION OF EXAMPLE EMBODIMENTS

Overview

Figure 1:
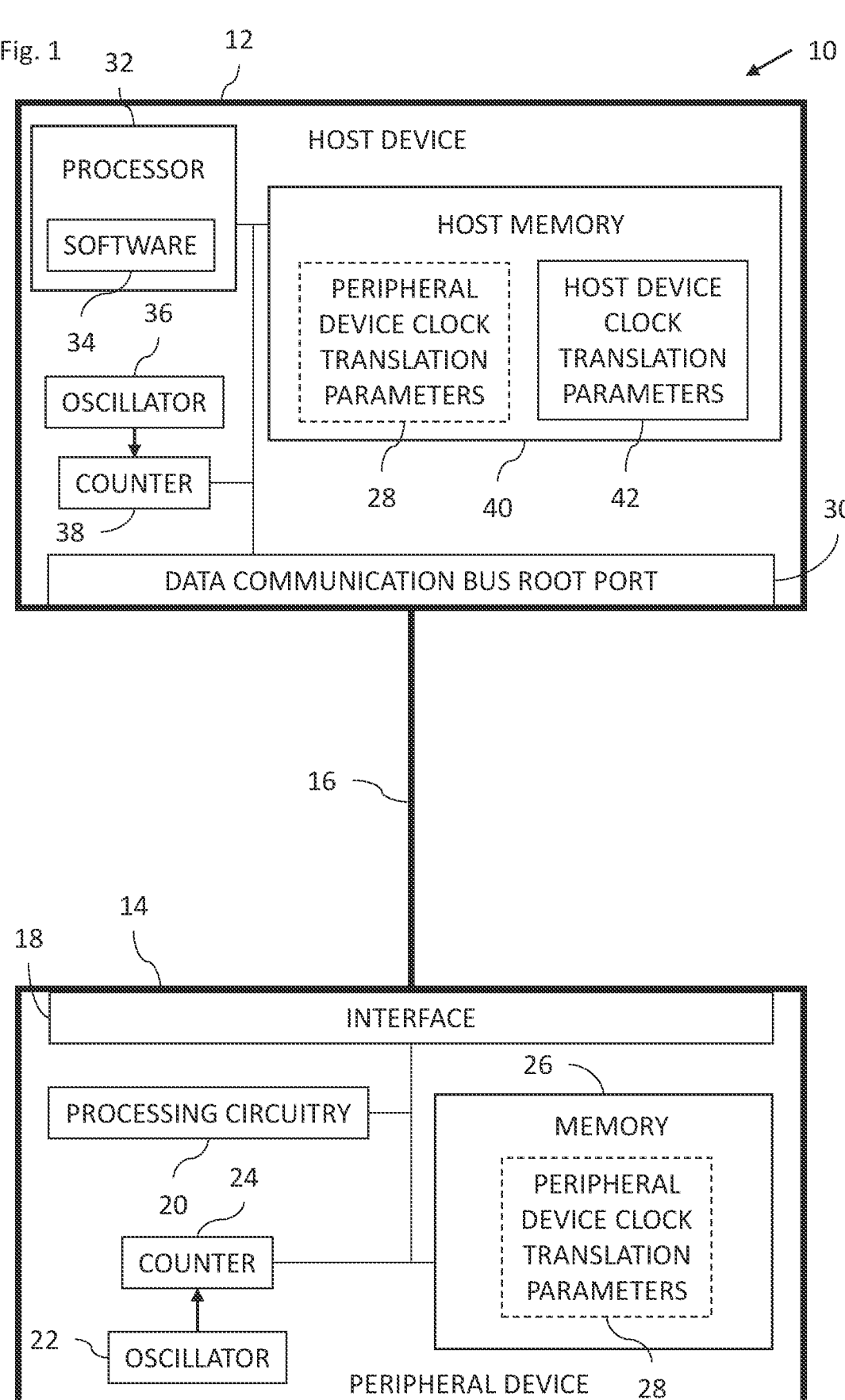
FIG. 1 is a block diagram view of a clock synchronization system constructed and operative in accordance with an embodiment of the present invention.

A device may track time using a counter which counts oscillations of an oscillator or another frequency source. The value of the counter generally does not correspond to a wall-clock time (e.g., a time-of-day value). Although it is possible to have a wall-clock clock in hardware, the general procedure is to maintain translation parameters which software uses to translate from the value of the counter to a wall-clock time (e.g., using a Kernel mode driver). The Kernel space may expose a memory location holding the translation parameters to user space so that the translation parameters are exposed to user space software to allow computation of the wall-clock time by user space software. The user space software reads the counter value and computes the wall-clock time using the translation parameters without having to ask the Kernel space to compute the wall-clock time. The above may be performed by central processing units (CPUs) and/or graphics processing units (GPUs).

In some scenarios, a host device may discipline its clock based on the clock of a peripheral device (such as a network interface controller (NIC)) connected to the host device using software running on the CPU of the host device, for example using PTM. This clock synchronization method may use a disproportionate amount of CPU resources and may be subject to crashing or being terminated to save memory, for example. In cloud computing scenarios, the CPU may be a particularly scarce and expensive resource making use of the CPU for clock synchronization more problematic.

One solution is to offload part of the synchronization from the CPU to a Peripheral Component Interconnect Express (PCIe) root port on host side, which performs many of the clock synchronization interactions with the peripheral device. This provides a more robust solution to clock synchronization. However, when the peripheral device requests the host side time, it receives a counter value which the kernel mode driver running on the hosts translates to a wall-clock value and therefore the host CPU is still involved throughout the clock synchronization process.

Embodiments of the present invention address at least some of the above drawbacks by offloading clock synchronization from a CPU of a host device to a peripheral device connected the host device and/or to a data communication bus root port.

In some embodiments, the peripheral device receives a host device counter value from the host device, for example, via a PTM interaction, with hardware of the host device, such as, the data communication bus root port. The peripheral device reads host device clock translation parameters from host memory. The host device clock translation parameters allow the peripheral device to compute the host device wall-clock time from the received host device counter value. In this manner, the host software does not need to be involved with computing the host device wall-clock time from the host device counter value. The peripheral device also retrieves it local counter value and the peripheral device clock translation parameters, which allow the peripheral device to compute a wall-clock time of the peripheral device from the retrieved peripheral device counter value. The peripheral device may then compute a clock correction based on the difference between the peripheral wall-clock time and the host device host wall-clock time. The peripheral device may then correct the host device clock time by correcting the host device clock translation parameters (so that the host device clock follows the peripheral device clock) or correct the peripheral device clock time by correcting the peripheral device clock translation parameters (so that the peripheral device clock follows the host device clock). In some embodiments, the peripheral device translation parameters are stored in peripheral device memory. In other embodiments, the peripheral device translation parameters are stored in the host memory. In the above manner, the peripheral device performs most of the clock synchronization steps, while host side hardware such as the data communication bus root port provides the host device counter value to the peripheral device. The peripheral device may perform the clock synchronization steps using hardware and/or firmware.

The above offloading process may be initiated by software or firmware running on the host device, but once offloading has been completed the software or firmware does not need to perform steps in the clock synchronization process. The offloading process may include instructing the peripheral device to perform clock synchronization with the data communication bus root port, and may also include providing access to the various counters and parameters by the peripheral device and/or the data communication bus root port.

In the above manner, the peripheral device may perform clock synchronization with multiple host devices or multiple virtual machines. In such a case, there may be multiple instances of the peripheral device translation parameters, so that for each host device there is a set of host device translation parameters and peripheral device translation parameters. It may be particularly useful to store the respective peripheral device translation parameters in the respective host memories.

In some embodiments, the data communication bus root port may perform many of the clock synchronization steps, such as retrieving the host device counter value and the host device clock translation parameters from host memory. The data communication bus root port may also receive the peripheral device counter value, for example, via a PTM interaction with the peripheral device, and retrieve the peripheral device clock translation parameters from host memory. The data communication bus root port may then compute a clock correction based on the difference between the peripheral wall-clock time and the host device host wall-clock time. The data communication bus root port may then correct the host device clock time by correcting the host device clock translation parameters (so that the host device clock follows the peripheral device clock) or correct the peripheral device clock time by correcting the peripheral device clock translation parameters (so that the peripheral device clock follows the host device clock). In the above manner, the data communication bus root port performs most of the clock synchronization steps, while the peripheral device provides the peripheral device counter value to the data communication bus root port.

System Description

Reference is now made to FIG. 1, which is a block diagram view of clock synchronization system 10 constructed and operative in accordance with an embodiment of the present invention. The clock synchronization system 10 includes a host device 12 and a peripheral device 14 connected via a data communication bus 16 operating according to any suitable protocol, for example, PCIe.

The peripheral device 14 includes: an interface 18 configured to be connected to data communication bus 16; processing circuitry 20; an oscillator 22 configured to generate an oscillatory signal; and a counter 24 configured to be driven by the oscillatory signal generated by the oscillator 22. The counter 24 is configured to count features of the oscillatory signal and provide a peripheral device counter value. The peripheral device 14 also includes a memory 26, which may be configured to store peripheral device clock translation parameters 28 providing a translation between the peripheral device counter value and a peripheral device clock time (e.g., wall-clock time or time-of-day value of the peripheral device 14). In some embodiments, the peripheral device clock translation parameters 28 are stored in the host device 12, as described in more detail below.

The host device 12 includes: a data communication bus port 30 configured to be connected to data communication bus 16; a processor 32 configured to execute software 34 described in more detail below; an oscillator 36 configured to generate an oscillatory signal; and a counter 38 configured to be driven by the oscillatory signal generated by the oscillator 36. The counter 38 is configured to count features of the oscillatory signal and provide a host device counter value. The host device 12 also includes a host memory 40, which may be configured to store host device clock translation parameters 42 providing a translation between the host device counter value and a host device clock time (e.g., wall-clock time or time-of-day value of the host device 12).

In some embodiments, the host memory 40 is also configured to store the peripheral device clock translation parameters 28.

The data communication bus port 30 may be a PCIe root port. The data communication bus port 30 may be configured as a hardware component running suitable firmware. In some embodiments, the data communication bus port 30 is integrated into a CPU chip including the processor 32. In other embodiments, the data communication bus port 30 is included in a chip which is separate from the CPU chip. The data communication bus port 30 may serve as interface between the processor 32 and all peripheral devices connected to the host device 12. The data communication bus port 30 may be the root of the PCIe hierarchy, control the PCIe hierarchy, and control and enumerate all the peripheral devices.

The processor 32 may be configured to execute software 34 to offload one or more of the following to the peripheral device 14: computation of a clock correction (to correct the peripheral device clock translation parameters 28 or the host device clock translation parameters 42 as described in more detail with reference to FIG. 2); and correction of the host device clock translation parameters 42 or the peripheral device clock translation parameters 28 based on the clock correction, as described in more detail with reference to FIG. 2.

Figure 3:
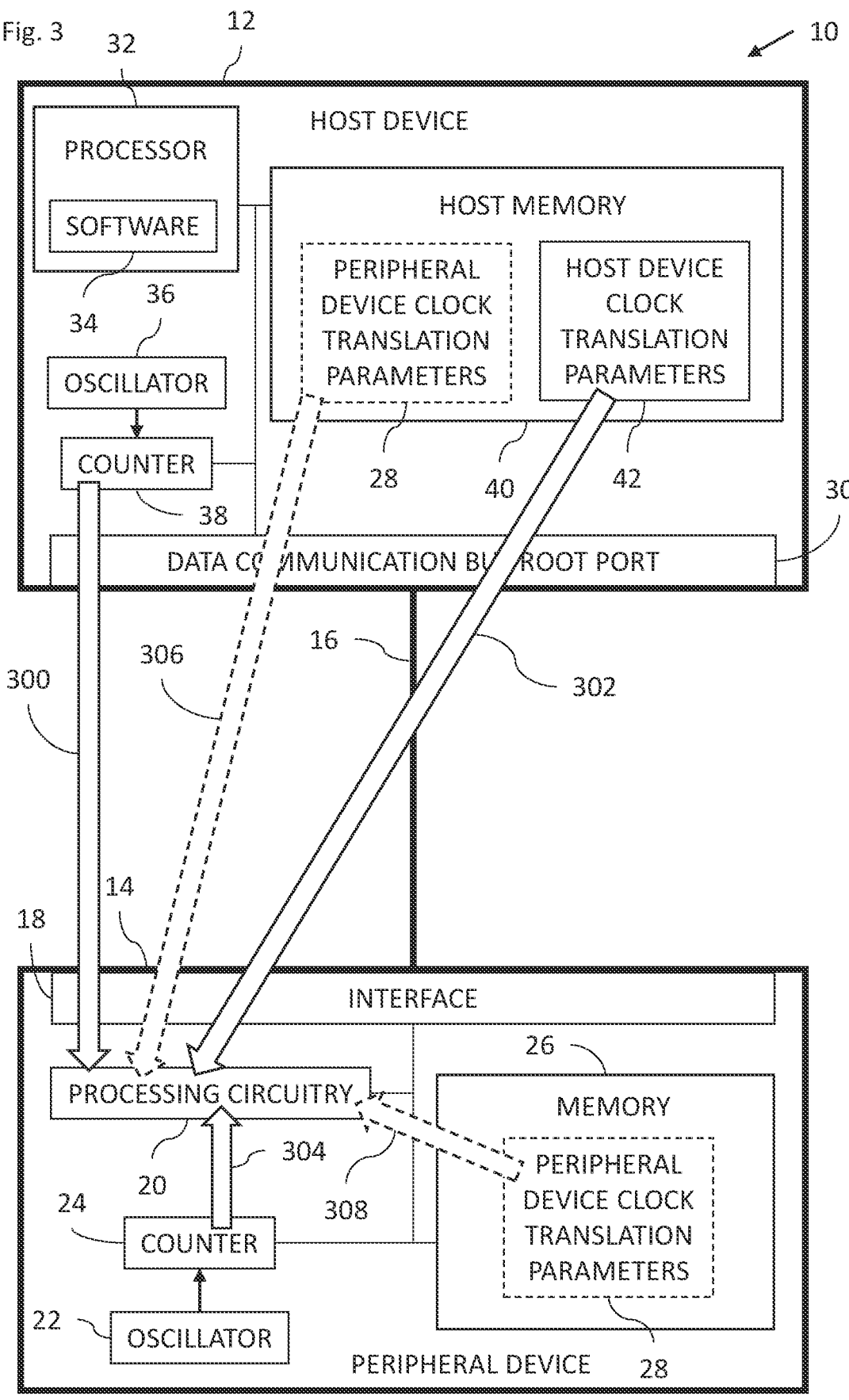
FIGS. 3 and 4 are block diagram views of the system of FIG. 1 illustrating steps in the method of FIG. 2.

Reference is now made to FIG. 2, which is a flowchart 200 including steps in a method of operation of the system of FIG. 1. Reference is also made to FIG. 3, which is a block diagram view of the system 10 of FIG. 1 illustrating some of the steps in the method of FIG. 2. The processing circuitry 20 is configured to receive a host device counter value from the host device 12 (block 202 and arrow 300). In some embodiments, the processing circuitry 20 is configured to receive the host device counter value from the data communication bus root port 30 of the host device 12 (e.g., via a PTM interaction). The processing circuitry 20 is configured to read host device clock translation parameters 42 from the host memory 40 of the host device 12 (block 204 and arrow 302).

The processing circuitry 20 is configured to read the peripheral device counter value from the counter 24 (block 206 and arrow 304). The processing circuitry 20 is configured to read the peripheral device clock translation parameters 28 (block 208). In embodiments where the peripheral device clock translation parameters 28 are stored in the host memory 40, the processing circuitry 20 is configured to read the peripheral device clock translation parameters 28 from the host memory 40 (arrow 306). In embodiments where the peripheral device clock translation parameters 28 are stored in the memory 26 of the peripheral device 14, the processing circuitry 20 is configured to read the peripheral device clock translation parameters 28 from the memory 26 of the peripheral device 14 (arrow 308).

Figure 4:
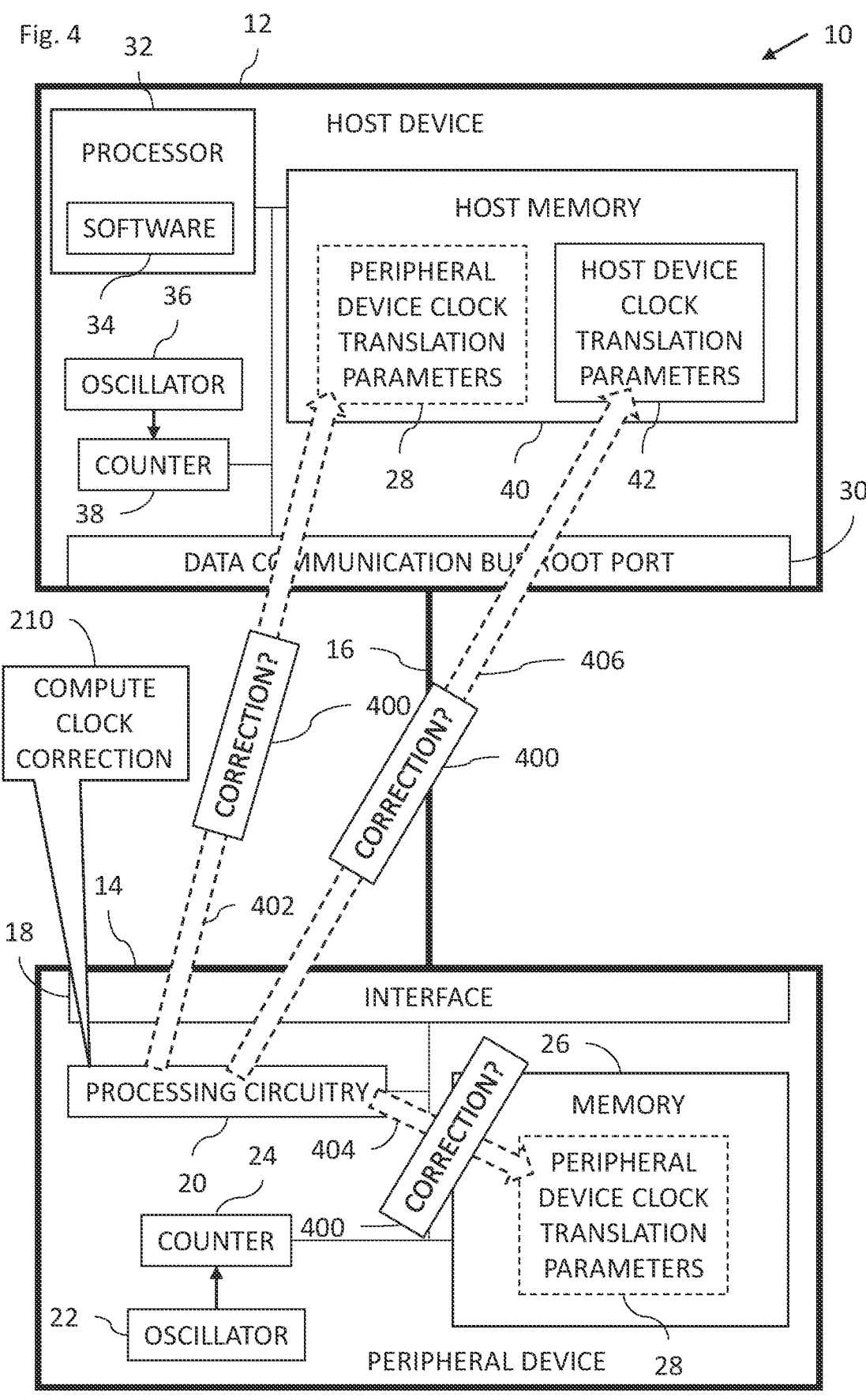

Reference is now made to FIG. 4, which is a block diagram view of the system 10 of FIG. 1 illustrating other steps in the method of FIG. 2. Reference is also made to FIG. 2. The processing circuitry 20 is configured to compute a clock correction 400 as a function of a difference between the host device clock time and the peripheral clock time, based on the received host device counter value, the read host device clock translation parameters 42, the read peripheral device counter value, and the read peripheral device clock translation parameters 28 (block 210). For example, the host device clock time may be computed from the host device counter value and the host device clock translation parameters 42, and the peripheral device clock time may be computed from the peripheral device counter value and the peripheral device clock translation parameters 28.

The processing circuitry 20 is configured to correct the host device clock translation parameters or the peripheral device clock translation parameters based on the clock correction 400 (block 212) as described in more detail below.

In some embodiments, the processing circuitry 20 is configured to correct the peripheral device clock translation parameters 28 based on the clock correction 400 thereby causing the peripheral device clock time to follow the host device clock time. In embodiments where the peripheral device clock translation parameters are stored in the host memory 40, the processing circuitry 20 is configured to correct the peripheral device clock translation parameters 28 in the host memory 40 (arrow 402). In embodiments where the peripheral device clock translation parameters 28 are stored in the memory 26 of the peripheral device 14, the processing circuitry 20 is configured to correct the peripheral device clock translation parameters 28 stored in memory 26 of the peripheral device 14 (arrow 404).

In other embodiments, the processing circuitry 20 is configured to correct the host device clock translation parameters 42 stored in the host memory 40 thereby causing the host device clock time to follow the peripheral device clock time (arrow 406).

In practice, some, or all of the functions of the processing circuitry 20 may be combined in a single physical component or, alternatively, implemented using multiple physical components. These physical components may comprise hard-wired or programmable devices, or a combination of the two. In some embodiments, at least some of the functions of the processing circuitry 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Reference is now made to FIG. 5, which is a block diagram view of a multi-host clock synchronization system 500. The multi-host clock synchronization system 500 includes multiple host machines 502-1, 502-2, 503-3. Each host machine 502 may be substantially the same as the host device 12 or as a virtual machine disposed in a host device 504. The host machines 502 are connected to the peripheral device 14 which serves the host machines 502 and provides clock synchronization services to the host machines 502 in substantially the same manner that the peripheral device 14 performed clock synchronization with host device 12, as described above with reference to FIGS. 1-4. The processing circuitry 20 is configured to compute clock corrections (block 508) with respect to the clock values of the host machines 502, and correct multiple sets of peripheral device translation parameters 28 providing translations between the peripheral device counter value of the counter 24 and respective peripheral device clock times with respect to respective host device clock times of the respective multiple host machines 502 (based on the computed clock corrections) so that the clock of the peripheral device 14 may individually follow the clock of each of the host machines 502 (arrows 506). For example, peripheral device clock translation parameters 28-1 provide a translation between the peripheral device counter value of the counter 24 and the peripheral device clock time so that the computed peripheral device clock time follows the host device clock time of host machine 502-1, peripheral device clock translation parameters 28-2 provide a translation between the peripheral device counter value of the counter 24 and the peripheral device clock time so that the computed peripheral device clock time follows the host device clock time of host machine 502-2, and so on. The processing circuitry 20 is configured to correct the multiple sets of the peripheral device translation parameters 28 stored in host memories 40 of the respective multiple host machines 502. For example, the processing circuitry 20 is configured to correct the peripheral device clock translation parameters 28-1 stored in host memory 40-1, the processing circuitry 20 is configured to correct the peripheral device clock translation parameters 28-2 stored in host memory 40-2, and so on.

Figure 6:
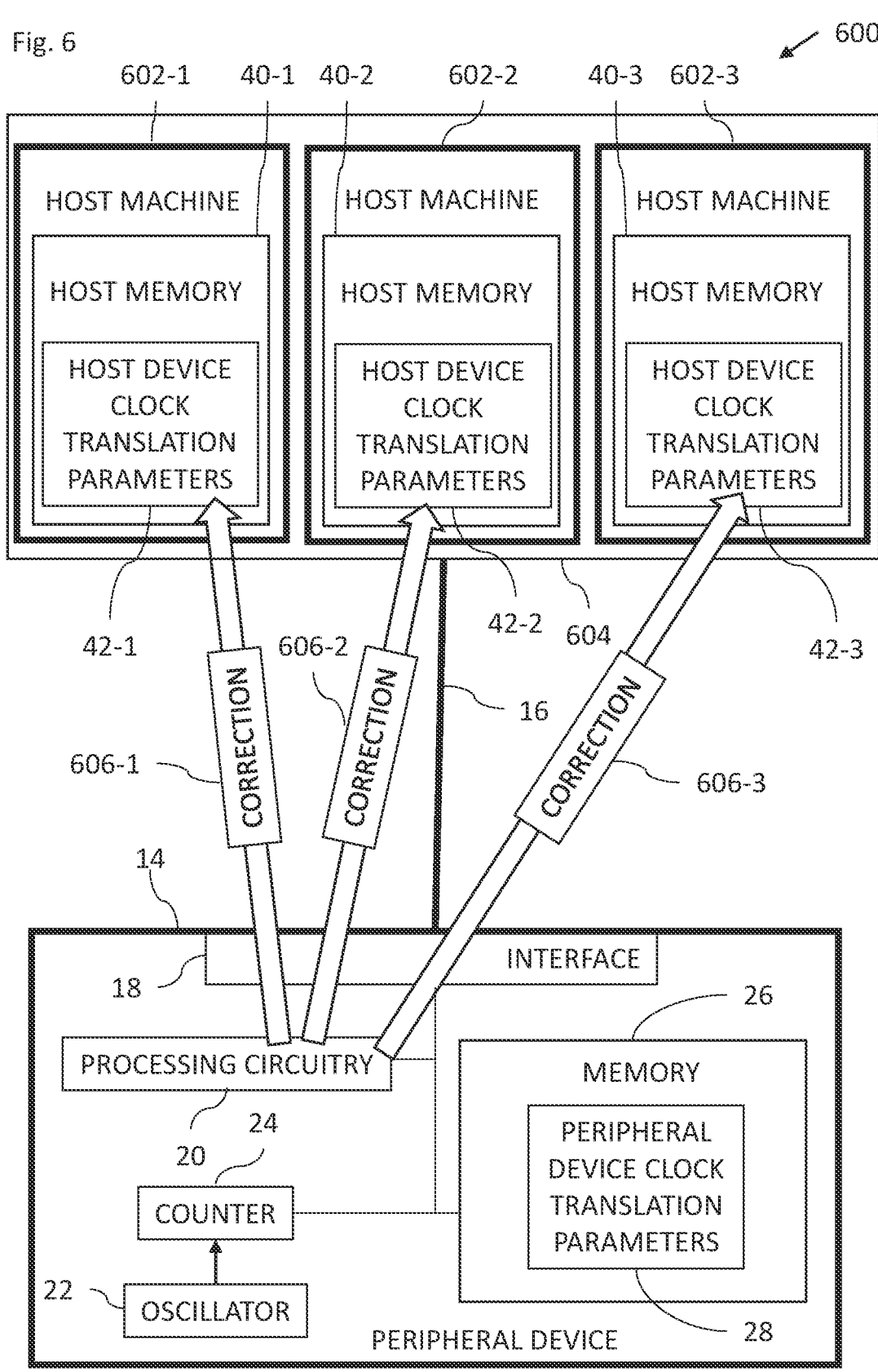

Reference is now made to FIG. 6, which is a block diagram view of a multi-host clock synchronization system 600. The multi-host clock synchronization system 600 may include multiple host machines 602. Each host machine 602 may be substantially the same as the host device 12 or as a virtual machine disposed in a host device 604. The host machines 602 are connected to the peripheral device 14 which serves the host machines 602 and provides clock synchronization services to the host machines 602 in substantially the same manner that the peripheral device 14 performed clock synchronization with host device 12, as described above with reference to FIGS. 1-4. The multi-host clock synchronization system 600 is substantially the same as the multi-host clock synchronization system 500 of FIG. 5 except for the following differences.

In the multi-host clock synchronization system 600, the peripheral device clock translation parameters 28 are stored in the memory 26 of the peripheral device 14, and the host device clock translation parameters 42 of each host machine 602 are individually corrected so that the clock of each host machine 602 follows the clock of the peripheral device 14, as described in more detail below.

The processing circuitry 20 is configured to compute clock corrections (block 606) with respect to the clock value of each of the host machines 602 and the clock time of the peripheral device 14. For example, the processing circuitry 20 is configured to compute a clock correction 606-1 to the clock value of host machine 602-1 with respect to the clock value of peripheral device 14, the processing circuitry 20 is configured to compute a clock correction 606-2 to the clock value of host machine 602-2 with respect to the clock value of peripheral device 14, and so on.

The processing circuitry 20 is configured, based on the computed clock corrections, to correct multiple sets of host device translation parameters 42 providing translations between host device counter values and the respective host device clock times of the respective host machines 602 with respect to the peripheral device clock time causing each of the host device clock times to follow the peripheral device clock time. The processing circuitry 20 is configured to correct the multiple sets of the host device clock translation parameters 42 stored in host memories 40 of the respective multiple host machines 602. For example, the processing circuitry 20 is configured, based on clock correction 606-1, to correct the host device clock translation parameters 42-1 stored in host memory 40-1, the processing circuitry 20 is configured, based on clock correction 606-2, to correct the host device clock translation parameters 42-2 stored in host memory 40-2, and so on. For example, host device clock translation parameters 42-1 provide a translation between the host device counter value of host machine 602-1 and the host device clock time of host machine 602-1 so that the computed host device clock time of host machine 602-1 follows the clock of peripheral device 14, host device clock translation parameters 42-2 provide a translation between the host device counter value of host machine 602-2 and the host device clock time of host machine 602-2 so that the computed host device clock time of host machine 602-2 follows the clock of peripheral device 14, and so on.

Figure 7:
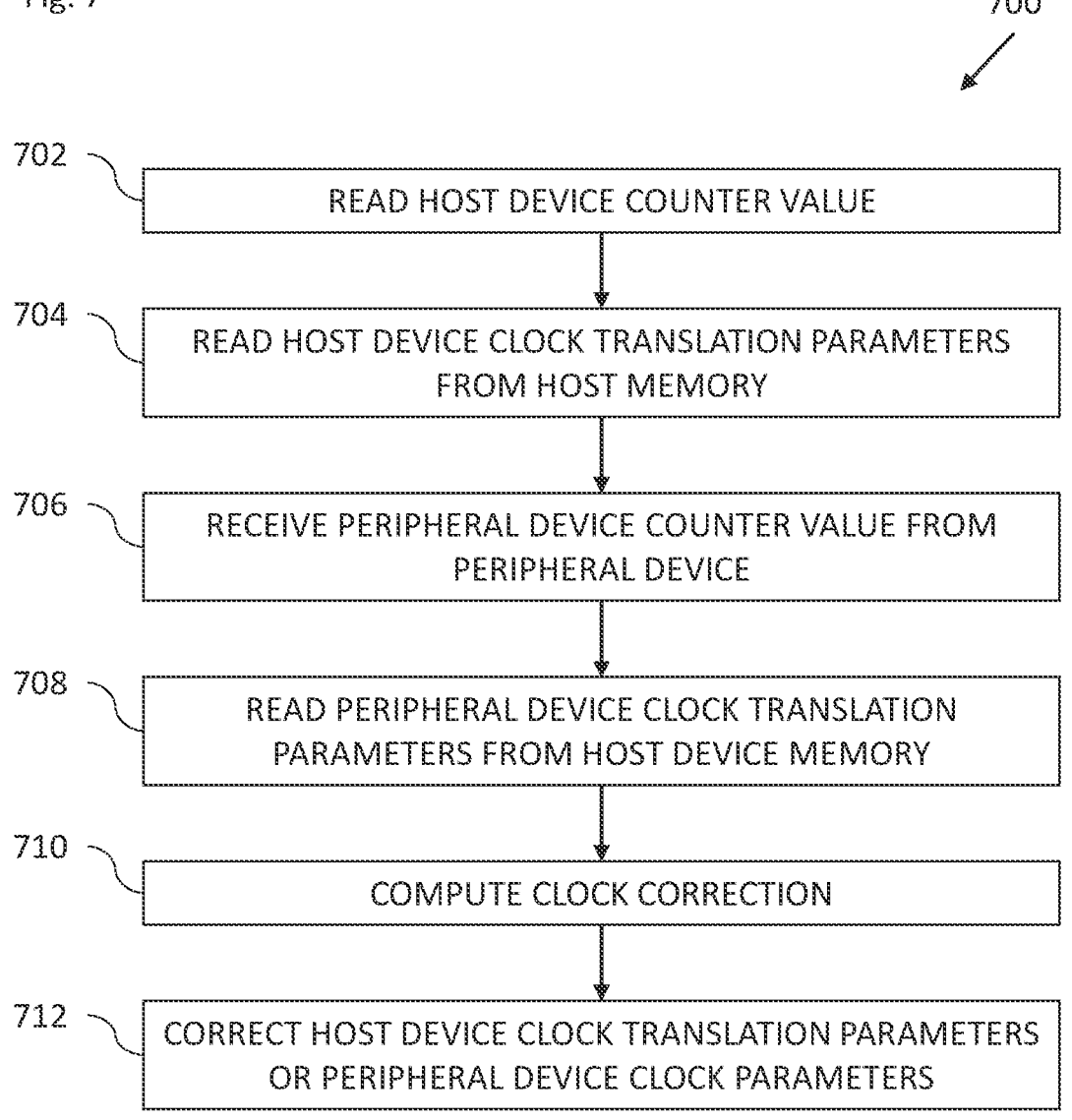
FIG. 7 is a flowchart including steps in an alternative method of operation of the system of FIG. 1.
Figure 8:
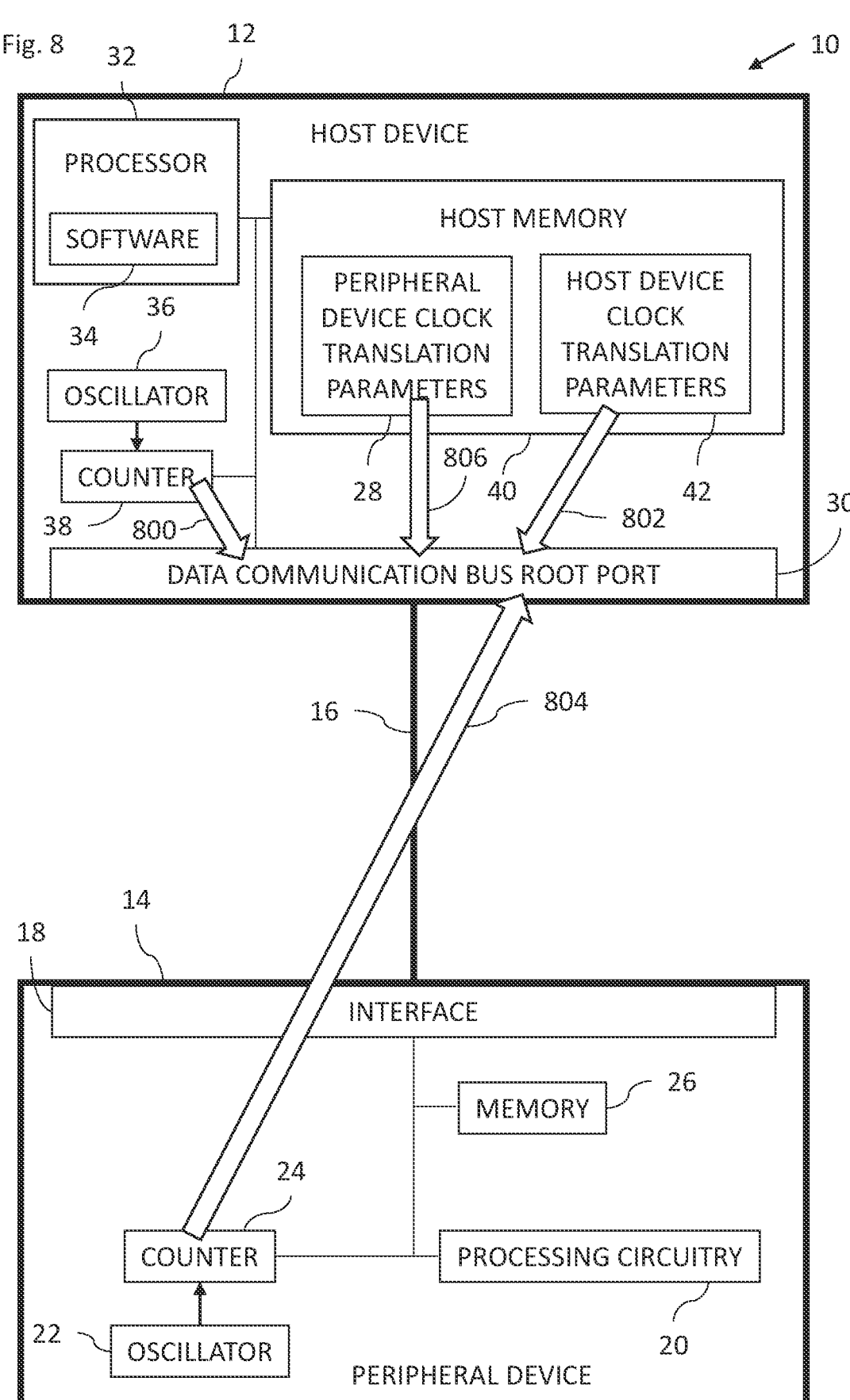
FIGS. 8 and 9 are block diagram views of the system of FIG. 1 illustrating steps in the method of FIG. 7.

Reference is now made to FIG. 7, which is a flowchart 700 including steps in an alternative method of operation of the system 10 of FIG. 1. Reference is also made to FIG. 8, which is a block diagram view of the system 10 of FIG. 1 illustrating some of the steps in the method of FIG. 7. The data communication bus port 30 is configured to read the host device counter value from the counter 38 (block 702 and arrow 800). The data communication bus port 30 is configured to read the host device clock translation parameters 42 from the host memory 40 (block 704 and arrow 802). The data communication bus port 30 is configured to receive the peripheral device counter value from the peripheral device 14 via the data communication bus 16 (block 706 and arrow 804). The data communication bus port 30 is configured to read peripheral device clock translation parameters 28 from the host memory 40 (block 708 and arrow 806).

Figure 9:
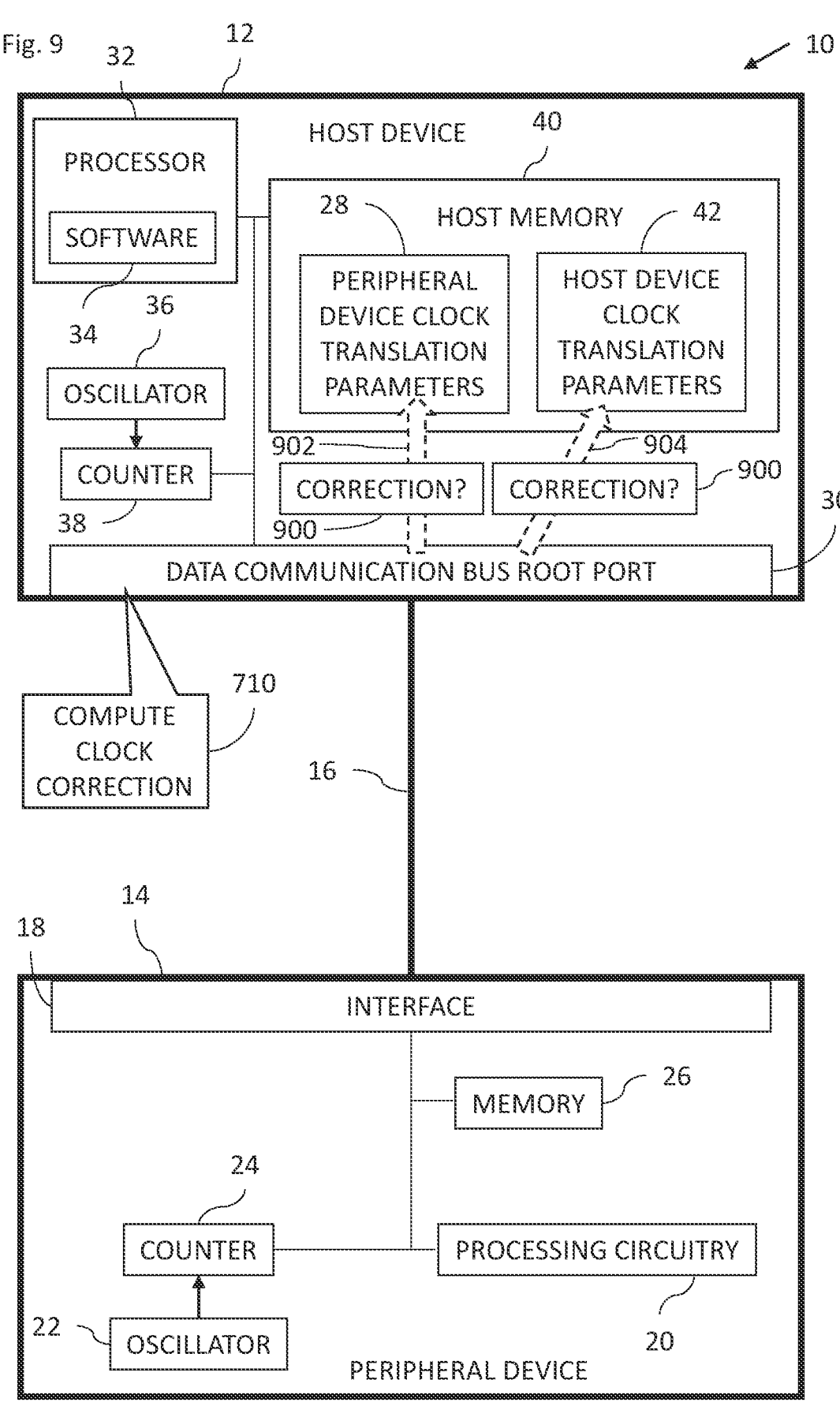

Reference is now made to FIG. 9, which is a block diagram view of the system 10 of FIG. 1 illustrating other steps in the method of FIG. 7. Reference is also made to FIG. 7. The data communication bus port 30 is configured to compute a clock correction 900 as a function of a difference between the host device clock time and the peripheral clock time (block 710), based on the read host device counter value, the read host device clock translation parameters 42, the received peripheral device counter value, and the received peripheral device clock translation parameters 28.

The data communication bus port 30 is configured to correct the host device clock translation parameters 42 or the peripheral device clock translation parameters 28 based on the clock correction 900 (block 712). In some embodiments, the data communication bus root port 30 is configured to correct the peripheral device clock translation parameters 28 (arrow 902) thereby causing the peripheral device clock time to follow the host device clock time. In other embodiments, the data communication bus root port 30 is configured to correct the host device clock translation parameters 42 (arrow 904) thereby causing the host device clock time to follow the peripheral device clock time.

In practice, some, or all of the functions of the data communication bus port 30 may be combined in a single physical component or, alternatively, implemented using multiple physical components. These physical components may comprise hard-wired or programmable devices, or a combination of the two. In some embodiments, at least some of the functions of the data communication bus port 30 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove.

Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A peripheral device, comprising:
an oscillator;
a counter to be driven by the oscillator and provide a peripheral device counter value; and
processing circuitry to:
  receive a host device counter value from a host device;
  read host device clock translation parameters from a host memory of the host device, the host device clock translation parameters providing a translation between the host device counter value and a host device clock time;
  read peripheral device clock translation parameters, the peripheral device clock translation parameters providing a translation between the peripheral device counter value and a peripheral device clock time;
  read the peripheral device counter value;
  compute a clock correction as a function of a difference between the host device clock time and the peripheral clock time, based on the host device counter value, the host device clock translation parameters, the peripheral device counter value, and the peripheral device clock translation parameters; and
  correct the host device clock translation parameters based on the clock correction thereby causing the host device clock time to follow the peripheral device clock time.

2. The device according to claim 1, wherein the peripheral device clock translation parameters are stored in the host memory, and the processing circuitry is configured to read the peripheral device clock translation parameters from the host memory.

3. The device according to claim 1, wherein the processing circuitry is to correct the peripheral device clock translation parameters thereby causing the peripheral device clock time to follow the host device clock time.

4. The device according to claim 3, wherein the peripheral device clock translation parameters are stored in the host memory, and the processing circuitry is to correct the peripheral device clock translation parameters in the host memory.

5. The device according to claim 3, wherein the peripheral device clock translation parameters are stored in the peripheral device, and the processing circuitry is to correct the peripheral device clock translation parameters stored in the peripheral device.

6. The device according to claim 1, wherein the processing circuitry is to receive the host device counter value from a data communication bus root port of the host device.

7. The device according to claim 1, wherein the processing circuitry is to correct multiple sets of peripheral device translation parameters providing translations between the peripheral device counter value and respective peripheral device clock times with respect to respective host device clock times of respective multiple host machines.

8. The device according to claim 7, wherein the processing circuitry is to correct the multiple sets of the peripheral device translation parameters stored in host memories of the respective multiple host machines.

9. The device according to claim 1, wherein the processing circuitry is to correct multiple sets of host device translation parameters providing translations between host device counter values and respective host device clock times of respective multiple host machines with respect to the peripheral device clock time causing each of the host device clock times to follow the peripheral device clock time.

10. The device according to claim 9, wherein the processing circuitry is to correct the multiple sets of the host device translation parameters stored in host memories of the respective multiple host machines.

11. A system, comprising:
the peripheral device according to claim 1; and
a host device to execute software to offload to the peripheral device:
  computation of the clock correction; and
  correction of the host device clock translation parameters or the peripheral device clock translation parameters based on the clock correction.

12. A host device, comprising:
an oscillator;
a counter to be driven by the oscillator and provide a host device counter value;
a host memory to store host device clock translation parameters providing a translation between the host device counter value and a host device clock time;
a data communication bus root port to:
  receive a peripheral device counter value from a peripheral device via a data communication bus;
  read peripheral device clock translation parameters from the host memory, the peripheral device clock translation parameters providing a translation between the peripheral device counter value and a peripheral device clock time;
  read the host device clock translation parameters from the host memory;
  compute a clock correction as a function of a difference between the host device clock time and the peripheral clock time, based on the host device counter value, the host device clock translation parameters, the peripheral device counter value, and the peripheral device clock translation parameters; and
  correct the host device clock translation parameters based on the clock correction thereby causing the host device clock time to follow the peripheral device clock time.

13. The device according to claim 12, wherein the data communication bus root port is to correct the peripheral device clock translation parameters thereby causing the peripheral device clock time to follow the host device clock time.

14. A method, comprising:
driving a counter by an oscillator;
providing, by the counter, a peripheral device counter value;
receiving a host device counter value from a host device;
reading host device clock translation parameters from a host memory of the host device, the host device clock translation parameters providing a translation between the host device counter value and a host device clock time;
reading peripheral device clock translation parameters, the peripheral device clock translation parameters providing a translation between the peripheral device counter value and a peripheral device clock time;

reading the peripheral device counter value;

computing a clock correction as a function of a difference between the host device clock time and the peripheral clock time, based on the host device counter value, the host device clock translation parameters, the peripheral device counter value, and the peripheral device clock translation parameters; and correcting the host device clock translation parameters based on the clock correction thereby causing the host device clock time to follow the peripheral device clock time.

15. The method according to claim 14, wherein the correcting includes correcting the peripheral device clock translation parameters thereby causing the peripheral device clock time to follow the host device clock time.

16. The method according to claim 14, wherein the correcting includes correcting multiple sets of peripheral device translation parameters providing translations between the peripheral device counter value and respective peripheral device clock times with respect to respective host device clock times of respective multiple host machines.

17. The method according to claim 14, wherein the correcting includes correcting multiple sets of host device translation parameters providing translations between host device counter values and respective host device clock times of respective multiple host machines with respect to the peripheral device clock time causing each of the host device clock times to follow the peripheral device clock time.

18. A method, comprising:

driving a counter by an oscillator;

providing, by the counter, a host device counter value;

storing host device clock translation parameters providing a translation between the host device counter value and a host device clock time;

receiving, by a data communication bus root port, a peripheral device counter value from a peripheral device via a data communication bus;

reading, by the data communication bus root port, peripheral device clock translation parameters from the host memory, the peripheral device clock translation parameters providing a translation between the peripheral device counter value and a peripheral device clock time;

reading, by the data communication bus root port, the host device clock translation parameters from the host memory;

computing, by the data communication bus root port, a clock correction as a function of a difference between the host device clock time and the peripheral clock time, based on the host device counter value, the host device clock translation parameters, the peripheral device counter value, and the peripheral device clock translation parameters; and correcting, by the data communication bus root port, the host device clock translation parameters based on the clock correction thereby causing the host device clock time to follow the peripheral device clock time.

* * * * *